United States Patent [19]

Storlie et al.

[11] Patent Number: 5,252,991
[45] Date of Patent: Oct. 12, 1993

[54] MEDIA EDGE SENSOR UTILIZING A LASER BEAM SCANNER

[75] Inventors: Chris A. Storlie; Edwin Hirahara, both of Boise, Id.

[73] Assignee: Hewlett-Packard Company, Palo Alto, Calif.

[21] Appl. No.: 811,763

[22] Filed: Dec. 17, 1991

[51] Int. Cl.⁵ .................. G03G 21/00; G01D 9/42
[52] U.S. Cl. .................... 346/108; 226/20; 250/236; 250/559; 250/560; 346/134; 355/203; 355/208; 355/308; 355/311; 355/317
[58] Field of Search ............... 355/203, 204, 205, 208, 355/308, 309, 311, 316, 317; 358/296, 300; 226/20; 271/227, 261; 250/559-561, 548, 236, 235; 356/384-385, 375, 429; 346/108, 134

[56] References Cited

U.S. PATENT DOCUMENTS

| | | | |
|---|---|---|---|
| 3,108,727 | 10/1963 | Farber | 226/20 |
| 4,158,134 | 6/1979 | Martin | 250/560 X |
| 4,184,080 | 1/1980 | Massey | 250/548 |
| 4,407,438 | 10/1983 | Wiechmann | 226/20 X |
| 4,485,982 | 12/1984 | St. John et al. | 226/20 X |
| 4,641,070 | 2/1987 | Pfizenmaier et al. | 250/548 X |
| 4,680,806 | 7/1987 | Bolza-Schünemann | 250/561 X |
| 4,734,868 | 3/1988 | DeLacy | 355/317 X |
| 4,799,084 | 1/1989 | Koike et al. | 355/317 |
| 4,839,699 | 6/1989 | Hosaka et al. | 355/55 |
| 4,886,967 | 12/1989 | Itakura | 271/227 X |
| 4,951,065 | 8/1990 | Okino | 358/296 X |
| 5,006,719 | 4/1991 | Blaser | 250/560 |
| 5,021,674 | 6/1991 | Brunner | 250/548 X |
| 5,032,733 | 7/1991 | Takeo et al. | 250/559 |
| 5,093,674 | 3/1992 | Starlie | 346/108 |
| 5,120,976 | 6/1992 | Clayton et al. | 250/560 |
| 5,141,585 | 8/1992 | Shino et al. | 226/20 X |

OTHER PUBLICATIONS

*IBM Technical Disclosure Bulletin*, vol. 20, No. 4, Sep. 1977, "Device for Feeding and Registering Paper", Bantz, D. F., Evangelisti, C. J., pp. 1623-1625.

*Primary Examiner*—A. T. Grimley
*Assistant Examiner*—Matthew S. Smith

[57] ABSTRACT

A system is described for providing positional information regarding a media sheet in an image forming apparatus. The system includes a laser for providing a beam of collimated light and a mechanism for moving a media sheet along an imprinting path. Beam sensors are placed in the imprinting path, and positioned so as to be partially shaded by a media sheet when it is moved along the imprinting path. A scanning system moves the light beam across the media sheet and past its edges to cause the beam to fall on the beam sensors, when the media sheet is partially shadowing the beam sensors. A processor is responsive to outputs from the beam sensors to determine positional information regarding the media sheet. Positional information is derived by determining the time during which the scanned beam is incident on a sensor.

8 Claims, 1 Drawing Sheet

MEDIA EDGE SENSOR UTILIZING A LASER BEAM SCANNER

FIELD OF THE INVENTION

This invention relates to apparatus for imprinting images on media sheets and, more particularly, to a sensing system for determining positional information regarding a media sheet as it passe through the apparatus.

BACKGROUND OF THE INVENTION

Present day imprinting mechanisms, i.e. electrophotographic copiers, laser printers, etc. are generally capable of handling more than one size of media sheet (i.e., paper). Ordinarily, such mechanisms do not automatically adjust the imprinted image on the different size papers unless instructed to do so by a user input. As the market place has become more sophisticated, a need has arisen for the imprinting apparatus to adjust the image in accordance with the positioning (or mispositioning) of the paper sheet. For instance, where pre-printed forms are employed, a paper position determining system allows the imprinting apparatus to place an image accurately relative to the printed areas of the form.

In the printing of color images, where multiple passes are required with intermediate fusings, it is vital that over-printed images be in accurate registration. However, each fusing may cause a shrinkage and/or misregistration of the paper. An accurate position sensing system can be used to accurately read the paper position and size and to allow the next color to be placed on the paper accurately relative to the first color. Such a system is described in copending U.S. patent Ser. 07/561,831, now U.S. Pat. No. 5,093,674, issue Mar. 3, 1992, entitled "Method and System for Compensating for Paper Shrinkage and Misalignment in Electrophotographic Color Printing", by Storlie and assigned to the same Assignee as this application.

Storlie describes a color laser printer wherein a paper position sensor is placed in the paper path and includes a pair of optical sensors that are positioned beneath opposing edges of a paper sheet as it passes along the paper path. Each optical sensor is operative to generate an output voltage whose level varies in accordance with the amount of sensor area that is shadowed by a passing paper sheet. The voltages generated from the sensors are processed to determine the orientation of the paper sheet and signals are derived to control the print mechanism to alter the image's position in accordance with the determined paper position.

In U.S. Pat. No. 4,799,084 to Koike et al., two systems for paper sensing are disclosed. The first is used for leading-edge detection and includes a mechanical arm which is caused to rotate and block a light beam when the leading edge of a paper sheet impacts upon it. The second is used to monitor lateral positional changes of a paper sheet. This is accomplished by having the paper sheet pass over a slot through which a light beam is directed so that the paper blocks a portion of the light from reaching an oppositely disposed sensor. By measuring the sensor voltage level, the position of the paper can be found.

A problem with systems such as that shown by Koike et al. is that any changes in the light level reaching the sensor appears as a change in the paper width or position. For example, if the light level output changes or if paper dust covers the sensor, the sensor perceives these light alterations as a change in paper width.

In U.S. Pat. No. 4,839,699 to Hosaka, et al., a system for determining the image position on a paper sheet is described (broadly) and employs a photo-diode array and fiber array for determining the position of a line or other image on the paper.

As indicated above, systems which rely upon analog level potentials to determine paper position are subject to various anomalies that affect the sensor's determination. Furthermore, such systems require careful adjustment to enable accurate positional determination of paper in the paper path.

Accordingly, it is an object of this invention to provide a media-sheet position determining system that is highly accurate.

It is still another object of this invention to provide a media-image position determining system which does not rely upon an analog voltage level for its determination.

It is yet another object of this invention to provide an improved media-sheet position determining system that employ a light source already present in the apparatus.

SUMMARY OF THE INVENTION

A system is described for providing positional information regarding a media sheet in an image forming apparatus. The system includes a laser for providing a beam of collimated light and a mechanism for moving a media sheet along an imprinting path. Beam sensors are placed in the imprinting path, and positioned so as to be partially shaded by a media sheet when it is moved along the imprinting path. A scanning system moves the light beam across the media sheet and past its edges to cause the beam to fall on the beam sensors, when the media sheet is partially shadowing the beam sensors. A processor is responsive to outputs from the beam sensors to determine positional information regarding the media sheet. Positional information is derived by determining the time during which the scanned beam is incident on a sensor.

DETAILED DESCRIPTION OF THE INVENTION

Figure 1:
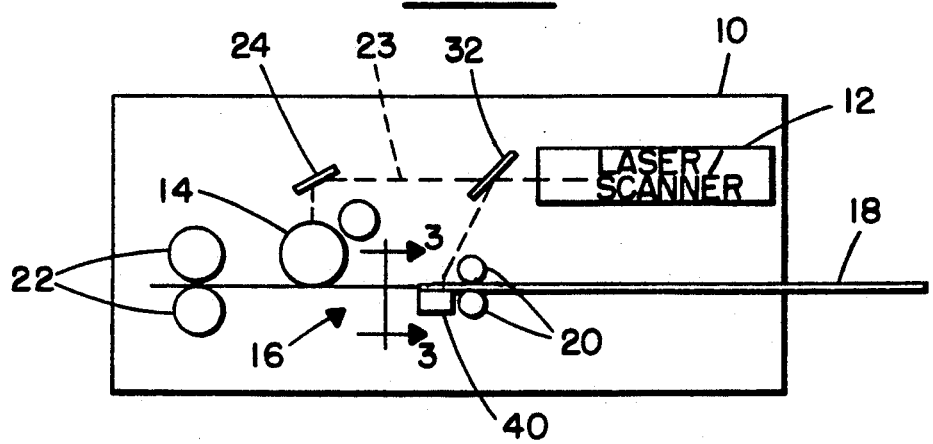
FIG. 1 is a side schematic view of laser printer incorporating the invention.

Referring now to FIG. 1, a laser printer 10 includes a laser/scanner mechanism 12, a photoconductor drum 14 and media sheet imprinting pathway 16. Media sheet 18 (in this case, paper) is propelled along imprinting pathway 16 by rollers 20 and 22. A scanned beam 23 from laser/scanner mechanism 12 contains modulation information for imprinting images on paper 18. Scanned beam 23 is produced by laser/scanner 12 and is reflected by mirror 24 onto the surface of photoconductor 14. All of the aforedescribed structure is conventional in laser printers.

Figure 2:
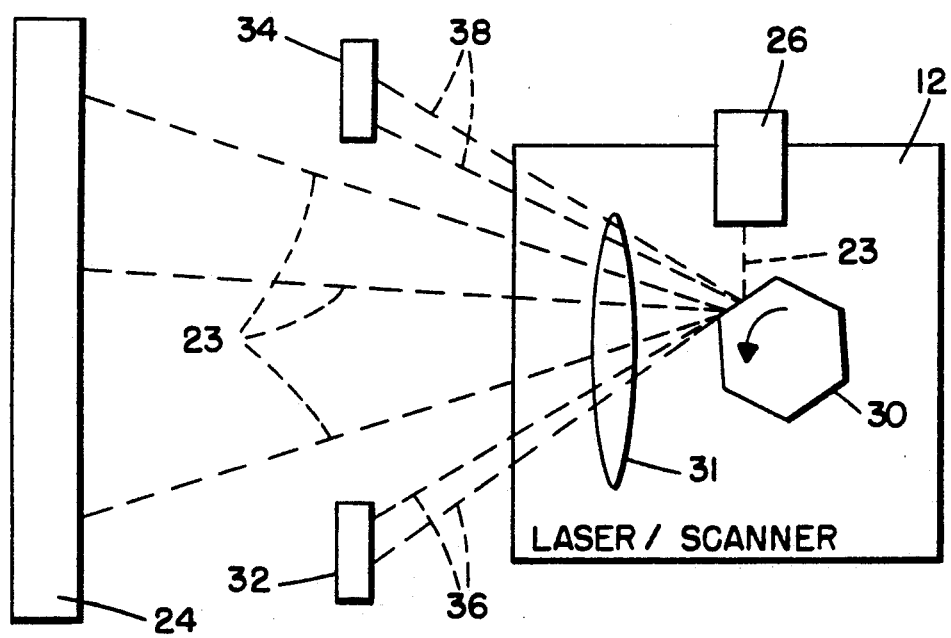
FIG. 2 is a plan view of a beam scanning mechanism within the laser printer of FIG. 1.

As shown in FIG. 2, laser/scanner mechanism 12 comprises a laser 26 whose beam 23 is modulated in accordance with image information to be imprinted on paper 18. A polygonal mirror 30 rotates and scans beam 23 across the expanse of mirror 24 where it is reflected onto photoconductor 14 (See FIG. 1). A lens 31 is provided to enhance the focus of the scanned beam.

Figure 3:
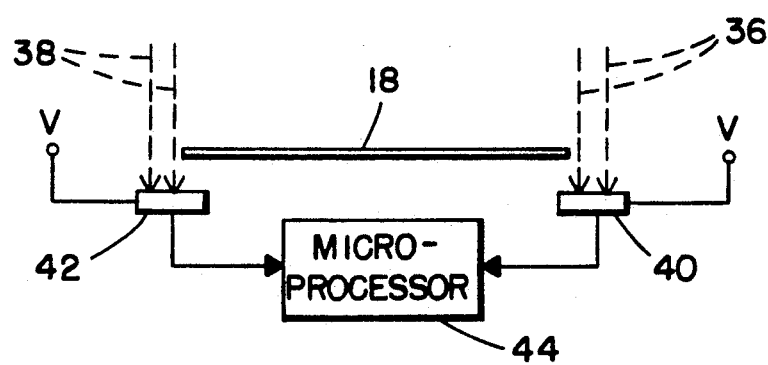
FIG. 3 is a schematic view showing the scanned beam across a media sheet and the relative position of beam sensors that are shadowed by the media sheet.

As shown in FIGS. 1 and 2, a pair of mirrors 32 and 34 are positioned between mirror 24 and polygonal mirror 30 so as to reflect beams 36 and 38 when they are directed thereto by polygonal mirror 30. Beams 36 and 38 are simply beam 23 when it is scanned past the limits of mirror 24 by polygonal mirror 30. It is to be noted that the placements of mirrors 32 and 34 are adjusted so that they do not interfere with beam 23 as it is directed to mirror 24. Mirrors 32 and 34 are positioned, however, so as to direct beams 36 and 38, respectively, downwardly onto a pair of optical sensors 40 and 42 (see FIG. 3). Optical sensors 40 and 42 are positioned beneath media sheet 18 when it is positioned in imprinting path 16. Optical sensors 40 and 42 are only partially shaded by media-sheet 18 and provide signals indicative of the incidence of beams 36 and 38, respectively, to a microprocessor 44. In essence, each of optical sensors 40 and 42 provide a high output to microprocessor 44 during the time that beams 36 and 38 are respectively incident thereon. By measuring the pulse lengths of the outputs from optical sensors 40 and 42, microprocessor 44 can determine the width of media-sheet 18 and whether it is offset from the center line of imprinting path 16. The output pulse lengths are related to the time of incidence of scanned beams 36 and 38 on sensors 40 and 42 respectively. The sensed outputs from sensor 40 and 42 are thus only time dependent and are relatively insensitive to voltage amplitude variations.

Optical sensors 40 and 42 also enable the leading edge of media sheet 18 to be sensed. This is accomplished when two succeeding beam sensor outputs are received from sensors 40 and 42, with the former outputs indicating no shading of sensor 40 and 42 and the latter output indicating shading. In a similar manner, microprocessor 44 can take a number of output readings from sensors 40 and 42 during a media-sheet's passage thereover to determine if a media-sheet is skewed. In response, microprocssor 44 can provide commands to adjust the scan emanating from laser/scanner mechanism 12 so as to compensate for any skew. Further details regarding techniques of adjustment of laser/scanner mechanism 12 are shown in the aforementioned patent application of Storlie et al., the contents of which are incorporated herein by reference.

In summary, the media position sensor system determines the position of a media sheet by scanning laser beam across a pair of optical sensors prior to and after writing on a photoconductor. When the edge of the media sheet shadows a fraction of an optical sensor, the time length the sensor's output is high will be shortened by the fraction of the beam sensor covered by the media-sheet. Because a laser/scanner required in a laser printer is already very precise, this system allows for exceptionally precise and reproducible reading of paper edges. The cost of the sensor is low and includes only the addition of two inexpensive optical detectors and two small mirrors to the laser printer mechanism. Sensor alignment is not critical.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A system for providing positional information regarding a sheet having opposed edges, said system comprising:
   a light source providing a moving beam of light;
   plural beam sensor means, each said beam sensor means positioned so as to be partially shaded by opposed edges of a said sheet;
   scanning means for moving said beam across said sheet and past the opposed edges thereof, said beam falling on each said beam sensor means where said sheet is not shading a said beam sensor means; and
   circuitry means responsive to outputs from said beam sensor means for determining said positional information from a difference of exposure times of said beam of light on said plural beam sensor means, said circuitry means further determining a width of said sheet based upon said time said moving beam of light falls on said plural beam sensor means.

2. A system for providing positional information regarding a media sheet in a printer, said system comprising:
   a laser for providing a beam of collimated light that is modulated with information to be printed on said media sheet;
   means for moving said media sheet along an imprinting path;
   a pair of beam sensor means in said imprinting path and positioned adjacent opposed edges of said media sheet so as to be partially shaded by a media sheet when it is moved along said imprinting path;
   scanning means for scanning said modulated beam across said media sheet and past edges thereof to cause said beam to fall on each one of said pair of sensor means when said media sheet is shading said pair of sensor means, said scanning means further causing during a said scan, said modulated beam to expose a photoconductive surface in accordance with said modulation; and
   processor means responsive to a combination of outputs from said pair of beam sensor means for determining from a time relation between said outputs, said positional information.

3. The system as recited in claim 2, wherein said scanning means comprises:
   moving mirror means to scan said beam;
   a first mirror to reflect said scanned beam onto a photoconductive drum positioned in said imprinting path; and
   a pair of second mirrors positioned to reflect said scanned beam onto said two beam sensors.

4. The system as recited in claim 3 wherein said two beam sensors are located between a media sheet input in said imprinting path and said photoconductive surface, whereby said processor means provides signals for adjusting said scanning means in accordance with said sensor outputs before said media sheet arrives at said photoconductive surface.

5. The system as recited in claim 4, wherein said processor means includes means for measuring the times during which said scanned beam is incident on each said sensor, and for further determining a positional characteristic of said media sheet from said measured times.

6. The system as recited in claim 5 wherein said processor means causes said means for measuring to operate a plurality of times as a media sheet passes said beam sensor, whereby skew of said media sheet is determined.

7. The system as recited in claim 2, wherein said processor means includes means for measuring the times during which said scanned beam is incident on each said sensor, and for further determining a width of said media sheet from said measured times.

8. The system as recited in claim 2 wherein said processor means senses a leading edge of said media sheet by sensing a non-shadowed beam sensed output from said pair of beam sensor means followed by a shadowed beam-sensed output.

* * * * *